United States Patent [19]

Rak

[11] Patent Number: 4,642,631

[45] Date of Patent: Feb. 10, 1987

[54] INTERACTIVE SECURITY SYSTEM

[76] Inventor: Stanley C. Rak, 72711 Belair Rd., Palm Desert, Calif. 92260

[21] Appl. No.: 829,461

[22] Filed: Feb. 12, 1986

Related U.S. Application Data

[63] Continuation of Ser. No. 667,377, Nov. 1, 1984, abandoned.

[51] Int. Cl.[4] .................. H04Q 1/00

[52] U.S. Cl. .................. 340/825.31; 340/825.35; 361/172

[58] Field of Search .................. 340/825.3–825.34, 340/825.54, 64, 572, 542, 543; 70/278; 361/171, 172, 182; 235/382, 382.5

[56] References Cited

U.S. PATENT DOCUMENTS

| | | | |
|---|---|---|---|
| 3,377,616 | 4/1968 | Auer | 340/825.54 X |
| 3,769,514 | 10/1973 | Clark | 361/172 X |
| 3,803,551 | 4/1974 | Jordan | 340/64 |
| 4,200,227 | 4/1980 | Lemelson | 235/382 |
| 4,250,533 | 2/1981 | Nelson | 361/172 |
| 4,316,083 | 2/1982 | Harris et al. | 235/449 |
| 4,326,125 | 4/1982 | Flies | 235/443 |
| 4,333,072 | 6/1982 | Beigel | 340/825.54 |
| 4,354,189 | 10/1982 | Lemelson | 340/825.31 |
| 4,366,466 | 12/1982 | Lutz | 340/64 |
| 4,379,966 | 4/1983 | Flies | 235/443 |
| 4,388,524 | 6/1983 | Walton | 340/825.31 X |
| 4,412,216 | 10/1983 | Mole et al. | 340/825.31 |
| 4,438,426 | 3/1984 | Adkins | 340/64 |
| 4,509,092 | 4/1985 | Invernizzi | 361/172 |
| 4,509,093 | 4/1985 | Stellberger | 340/825.54 X |

*Primary Examiner*—Ulysses Weldon
*Attorney, Agent, or Firm*—Marvin S. Gittes

[57] ABSTRACT

A circuit produces a control signal which is input through a bi-directional communication device to a removable circuit. The removable circuit is set to a first logic state which is a function of the control signal and thereafter steps through a sequence of logic states with each logic state being a function of the previous logic state. The entire sequence of logic states is represented by a state signal or code word which is a function of the control signal. The produced state signal is compared to a predetermined stored state signal. Access is enabled in response to the production of a proper sequence of logic states, as indicated by the comparison of the produced state signal to the predetermined stored state signal. Security is improved because without knowledge of the control signal input to the removable circuit, an unauthorized user cannot ascertain the code word.

30 Claims, 7 Drawing Figures

INTERACTIVE SECURITY SYSTEM

This is a continuation of application Ser. No. 667,377 filed Nov. 1, 1984, now abandoned.

BACKGROUND OF THE INVENTION

The present invention relates generally to electronic data processing systems and more particularly to electronic security systems for controlling access to, or operation of, cars, homes, or the like.

There are numerous types of security systems and various coding schemes which are more or less useful to secure or operate the locks of cars, homes or the like. Some of these systems are quite simple and handy but offer only a minimum of protection and security, whereas others are highly sophisticated with electronic or otherwise coded devices. Such coded devices may include a magnetic card strip inserted into a card reader for reading the information coded on the card as disclosed in U.S. Pat. No. 4,316,083 to Harris et al., a punch card inserted into a card reader for reading the information coded on the card as disclosed in U.S. Pat. No. 3,803,551 to Jordan, a key equipped with microelectronic components inserted into a receptacle for interrogation of the information stored on the key as disclosed in U.S. Pat. No. 4,326,125 to Flies, or a coded device such as a card brought within the range of a field generated by the security system as disclosed in U.S. Pat. No. 4,354,189 to Lemelson.

All of these systems have their drawbacks. For example, if a punch card is lost or stolen, it is a simple matter to produce counterfeit punch cards which negate the effectiveness of the security system. Even with electronic key-type devices, should one be lost or stolen, the security code or codes retained by the key-type device can be ascertained by supplying power and inputting clock pulses or the like to the key-type device. Once the security codes are developed, counterfeit key-type devices can be produced thus rendering the security system useless.

The problem of impairing the effectiveness of the security system because of a lost or stolen punch card, key-type device, or other device used to gain access is well recognized. One solution for electronic key-type devices is to provide key-type devices which are programmable thus allowing the security codes to be changed.

Another proposed solution for electronic key-type devices is to provide a buffer between the electronic components carrying the coded information and the output ports of the key-type device as disclosed in U.S. Pat. No. 4,412,216 to Mole et al. In the patent to Mole et al. a shift register is used as the buffer. However, once the appropriate signal is found which causes the security code to be loaded into the shift register, the security code can easily be learned.

Designers of security systems are therefore faced with the competing design criterion of, on the one hand, designing a system offering maximum security against unauthorized duplication of the device used to gain access while on the other hand desiring a device which is simple, easy to fabricate, and easy to use.

SUMMARY OF THE PRESENT INVENTION

The present invention is directed to an interactive security system which overcomes the problems of unauthorized duplication of the device used to grant access, i.e. the key, by providing security codes output from the key which are a function of the control signals input to the key. Thus, should a key be lost or stolen, the security codes cannot be ascertained because the unauthorized user does not know what control signals must be input to cause the key to produce the required code word. Attempted interrogations of the key reveal no useful information. Because the security codes output from the key are produced as a function of the control signals input to the key, the present security system is said to be "interactive."

According to one embodiment, the interactive security system of the present invention includes a first circuit for producing a control signal. A second circuit is responsive to the first circuit for producing a code word or state signal representative of a sequence of logic states. The sequence of logic states is a function of the control signal. A memory is provided for storing a predetermined state signal. A circuit compares the produced state signal to the stored predetermined state signal. Access is enabled in response to the production of a proper sequence of logic states as indicated by the comparison of the produced state signal to the stored predetermind state signal.

According to another embodiment of the present invention, the production of more than one state signal, with each state signal representing a sequence of logic states, is required before access is enabled. The circuit for producing the state signals may include a memory device wherein the state signals are read from the memory device as a function of the control signals, or may include a conditional state device for cycling through the sequences of different logic states, with the first logic state in each sequence being a function of the control signal and each subsequent logic state in each sequence being a function of the previous logic state.

According to another embodiment of the present invention, the circuit for producing the state signal is removable. A circuit establishes bi-directional communication between the removable circuit and the circuit for comparing. The comparing circuit compares the state signal produced by the removable circuit to the stored predetermined state signal and enables access in response to the production of a proper sequence of logic states by the removable circuit as indicated by the comparison of the produced state signal to the stored state signal.

It is often desirable to control access to more than one device or function at a time. That can be accomplished by the present invention wherein the circuit for establishing bi-directional communication between the removable circuit and the circuit for comparing includes means for receiving which is manipulable into a plurality of positions by manipulation of the removable circuit. Each of the positions is representative of a function to which access is controlled. In another embodiment, the circuit for establishing bi-directional communication receives the removable circuit in a plurality of insertion orientations with each insertion orientation being representative of a device or function to which access is controlled.

According to another embodiment of the present invention access to an automobile is controlled. The removable circuit for producing the state signal takes the form of an electronic key-type device, and the circuit for establishing bi-directional communication can be manipulated by manipulation of the electronic key into various positions each controlling one of the door locks, the ignition, hood, trunk and glove compartment.

The interactive security system may additionally include a memory for storing a history of the bi-directional communications between the electronic key and the circuit for comparing and for storing the results of those communications. The memory can also store the maintenance history of the automobile.

According to another embodiment of the present invention, sensors produce signals indicating the present status of the automobile. Access to certain features is inhibited when a status signal indicates that the selected feature is not compatible with the present status of the automobile. For example, the hood would not be released even if the proper security codes were received if, for example, sensors indicated the automobile was in motion.

One object of the present invention is to provide an interactive security system wherein any desired degree of security can be acheived by varying the complexity of the state signals, or the number of state signals. Another object of the present invention is to provide an extremely flexible system which is expandable from a system operating one door to a system operating and controlling a variety of functions from one local or remote readout station and which can be tailored to the needs of the user without requiring modifications of the system hardware. Another object of the present invention is to control any electrically controlled device such as, but not limited to, solenoids, motors, solid state relays or the like. Another object of the present invention is to provide a device for granting access which is easy to use, comfortably sized as a single unit to carry in a pocket or purse, easy to fabricate, can be mass produced and programmed later, yet is safe from unauthorized duplication. These objects as well as various advantages and benefits of the present invention will become apparent from the description of the preferred embodiments hereinbelow.

DESCRIPTION OF A PREFERRED EMBODIMENT

Figure 1:
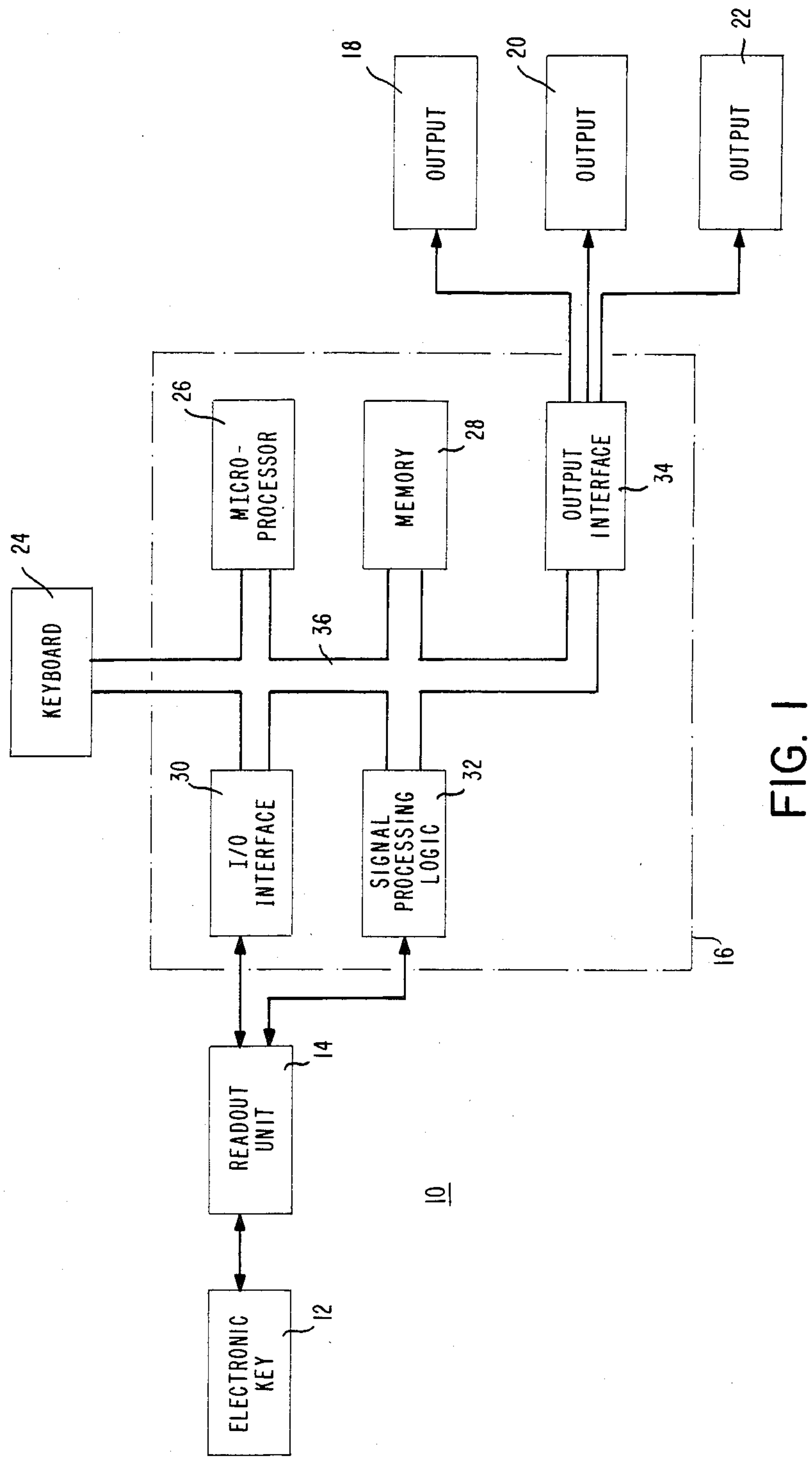
FIG. 1 is a block diagram illustrating an interactive security system constructed according to the teachings of the present invention.

FIG. 1 illustrates a block diagram of an interactive security system 10 constructed according to the teachings of the present invention. The interactive security system 10 is comprised of one or more physically independent or removable electronic access key devices referred to hereinafter as an electronic key 12. The security system 10 also includes a multi-positional readout unit 14 for receiving the removable electronic key 12, and a monitoring control unit 16 responsive to the readout unit 14. The monitoring control unit 16 controls access to a plurality of output devices 18, 20 and 22, as well as a keyboard 24.

The monitoring control unit 16 is comprised of a microprocessor 26, a memory 28, an input/output interface 30, signal processing logic 32, and an output interface 34 interconnected by a data bus 36. The input/output interface 30 and signal processing logic 32 are responsive to the readout unit 14 for conditioning signals for input to and output from microprocessor 26. The microprocessor 26 controls the operation of the security system 10 according to instructions preprogrammed in memory 28 according to well-known and standard programming techniques. The output interface 34 operates to activate one or more output devices 18, 20 and 22, which may be solenoids, motors, solid state relays, or other external devices in response to the microprocessor 26. The keyboard 24 communicates with the microprocessor 26 through the data bus 36. The monitoring control unit 16 may be constructed of any compatible commercially available components.

Briefly, the electronic key 12 is equipped with one or more components connected to form a conditional state device capable of analyzing input conditions and responding thereto. For example, the conditional state device can step through a sequence of logic states where a first logic state is determined by a control signal output from the control unit 16 and the next states are derived from the logical combination of the previous logic state and/or other control terms. The key produces a state signal representative of that sequence of logic states. Because the initial logic state of the sequence is determined in response to a control signal from the control unit 16, and each state is derived from the last state and/or other control terms including the input control signal, the state signal is a function of the signals input thereto by the control unit 16. Thus, it is very difficult for an unauthorized user to obtain information stored in the key absent knowledge of the control signals input thereto.

The control unit 16 controls the stepping sequence of logic states of the state device of the electronic key 12 by inputting clock pulses thereto; each clock pulse causes the production of another portion of the state signal. It is therefore possible to control the state signal or code word read from the electronic key 12.

By controlling the stepping sequence, the control unit 16 is capable of cycling the state device of the electronic key 12 through any number of stepping sequences. It is therefore possible to control the number of state signals or code words read from the electronic key 12. Because the electronic key 12 and control unit 16 operate in unison to generate the correct code words in the proper sequence, their synchronized operation renders it highly unlikely that the security system can be breached by mere input of randomly selected code words.

Briefly, the readout unit 14 is designed and built as an electrical receptacle able to establish electrical contact with the inserted removable electronic key 12. The readout unit 14 includes an inner cylinder which can be rotated into several defined positions within a protective, sealed, outer housing as will be described hereinbelow more fully. By pushing the electronic key 12 and inner cylinder against a plate that is equipped with contacts arranged in a circular pattern corresponding to the position of the inner cylinder and mounted at the rear end of the outer housing, a contact finger on that inner cylinder generates a request or interrupt signal, preferably by grounding that particular contact. Each request or interrupt signal is latched in the signal processing logic 32 and then logically combined to generate the desired interrupt signal. By processing that signal through commonly used and well known circuits or methods such as priority encoders or polling techniques as used for interrupt handling in computers, that particular request line is identified and secured. By reading the coded information from the electronic key 12, the control unit 16 then determines whether to grant access and to execute the particular function requested by that position of the readout unit 14 in conjunction with that electronic key 12. To do that, the control unit 16 has all necessary information stored in a programmable read only memory (PROM), erasable programmable read only memory (EPROM) or other commonly used memory or storage devices as indicated generally by reference number 28.

According to one embodiment of the present invention, the control unit 16 requests additional code words, pass words, or the like, by activating a keyboard type input device 24 and outputting a message to the user indicating that additional code words are required. Those additional code words or pass words can be changed at regular intervals, for instance, daily, and would have to be input via the keyboard 24 before the requested function would be executed by the control unit 16.

In another embodiment of the present invention, each attempted actuation, whether successful or not, of the security system 10 is recorded on any commonly available storage media to keep track of time, users, requested functions, attempts to gain unauthorized access to devices or restricted areas, or the like.

In another embodiment of the present invention, which is particularly useful for an automotive system, the control unit 16 contains information such as, but not limited to, vehicle identification number, owner data, odometer data, service information, and other data about the history and condition of the automobile. That information, taken together with the programs and data needed by the security system 10, is stored in a sealed portion of the control unit 16. This portion of the control unit 16 may take the form of a printed circuit board having PROMS or other nonvolatile storage devices completely encapsulated in epoxy or similar protection and therefore inaccessible and tamper-proof. Thus, cradle to grave information concerning an automobile would be available.

In another embodiment of the present invention, one or more positions of the multi-position readout unit 14 are used to request activation of one or more additional input devices such as keyboard 24 or similar devices. The keyboard 24 is then used to request or select other functions not normally provided by a particular position of the readout unit 14 thereby offering an almost unlimited number of functions to be selected or requested by one single readout unit 14. Total access and denial monitoring is maintained by the control unit 16 in accordance with the noted information read from the electronic key 12 used by that particular user of the security system 10.

After identifying the selected position of the readout unit 14, reading the coded information from the electronic key 12, processing that data together with its stored information, the control unit 16 appropriately activates or operates the selected function by activating one or more electrical devices 18, 20, 22, equipped with, for example, power drivers, converters, or similar devices.

In yet another embodiment of the present invention, a control unit processes additional data from other input interfaces (not shown) before activating the selected device even though the proper code word has been produced. For example, in an automotive environment the control unit 16 would not activate a starter motor to start the car engine if a sensor read by the control unit 16 indicated that the engine is already running. As another example, the control unit 16 would not operate an opening device for the hood if a sensor indicated that the car was in motion.

It should be apparent to those of ordinary skill in the art, that the present invention provides an interactive security system which is extremely flexible in nature and can be modified to accommodate an almost limitless number of situations and environments by providing suitable input devices, output devices, and various sensors. The description hereinbelow of one embodiment of the electronic key 12, readout device 14, and bi-directional communication scheme between the electronic key 12 and the control unit 16 is intended for purposes of illustration and not limitation.

Figure 2:
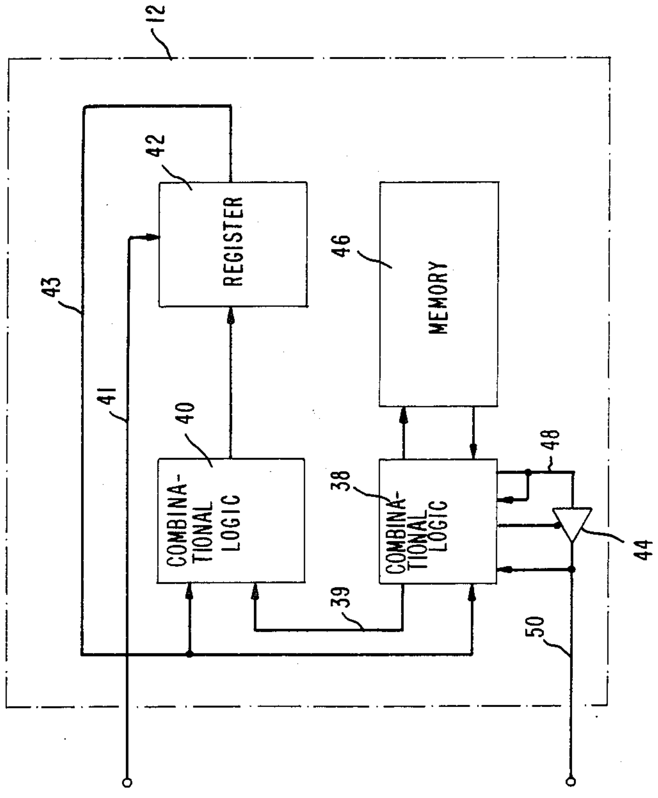
FIG. 2 is a block diagram illustrating the state device carried by the electronic key used in conjunction with the security system of FIG. 1.

A block diagram illustrating the circuits carried by the electronic key 12 is illustrated in FIG. 2. The circuitry of the electronic key 12 is constructed of one or more microelectronic circuits connected and/or programmed to operate as a conditional state device 13 in which a stepping sequence, or sequence of logic states, is generated by applying clock pulses. The clock pulses cause the state device to step from its present state to one or more possible next states with the next state being a function of the logical combination of the state device's present state and one or more control terms. An example of such a state device is the 82S159 available from Signetics.

The state device 13 is implemented by one or more microelectronic chips having combinational logic and registers as well as memory-type areas to hold one or more single bit or multi-bit code words. Such a device may include, for example, integrated circuits commonly referred to as integrated fuse logic (IFL), programmable array logic (PAL), programmable logic sequencers (PLS or FPLS) or similar solid state components which are field programmable.

In a simple embodiment, the stepping sequence may, for example, be a sequence of eight logic states. The control unit 16 first outputs a control signal which resets the state device 13 to a known initial state. The control unit 16 then sequentially outputs eight clock pulses. Each clock pulse causes the state device to step to the next state in the sequence and produce and output a signal representative of that state. After the eighth clock pulse, the control unit 16 has received eight signals, each representative of one state in the sequence of states. The eight signals are assembled into one signal referred to as a state signal or code word.

In FIG. 2, a register 42 holds a signal representative of the present state of a combinational fuse logic device 40. Upon receipt of a clock pulse C1 on line 41 from control unit 16, the signal representative of the present state is fed back via line 43 to combinational fuse logic devices 38 and 40. Upon receipt of the signal representative of the present state, logic device 38 outputs one bit of data on internal data line 48. That bit of data represents the present state and is one portion of the code word. Upon generation of the output bit on line 48, the logic device 38 combines, according to instructions stored in the memory 46, the signal available on line 43 with a term available from memory 46 to generate a control term. That control term is input via line 39 to the logic device 40. The signal representative of the present state is combined in logic device 40 with the control term from logic device 38 to generate the next state. A signal representative of that next state is fed to and written into the register 42. The entire process of outputting a signal representative of the present state and generating the next state can be repeated by applying another clock pulse C1 on line 41.

The data bit representative of the present state output on internal data line 48 is fed through an open collector or tri-state buffer 44 to a bi-directional data line 50 within readout unit 14 in FIG. 1. The state device 13 of the key 12 illustrated in FIG. 2, begins a stepping sequence when the logic device 38 senses a potential difference between internal data line 48 and the bi-directional data line 50.

As easily seen, data on the bi-directional data line 50 and the internal data line 48 are separated by the buffer 44 and must correspond to each other as long as the bi-directional data line 50 is being driven by the electronic key logic alone. If the signals on those two data lines do not correspond, it is an indication to the logic device 38 that the bi-directional communication line 50 is being driven from an outside logic source such as the monitoring control unit 16. After sensing that the signal on the internal data line 48 is not the same as the signal on the bi-directional data line 50, the logic device 38 generates a control term from instructions and/or other data in the memory 46 for driving the logic device 40 into a known initial state which is a first state in the stepping sequence. Thus, in one embodiment, the combination of signals of different states on bi-directional data line 50 and the internal data line 48 is used to generate a control term which causes the combinational fused logic 40 to be set to the first state in a stepping sequence. In a more complex embodiment the control signal could be an n-bit digital signal which determines which first state from a group of possible stepping sequences the logic device 40 is to be set to. Thereafter the rate of the stepping sequence of the state device 13 is controlled by controlling the input of clock pulses.

In its simplest implementation, the state device can be forced into a known, desired and anticipated state after power up. In a more advanced implementation, the state device can be cycled through a variety of stepping sequences by controlling the bi-directional data line 50 from the monitoring control unit 16 and thereafter reading each of the state signals, or code words, representative of the stepping sequences from the electronic key 12. The number of logic states in the stepping sequence and the number of sequences is substantially arbitrary depending upon the desired degree of security. Thus, code words of any desired length, and any desired number of code words can be produced. By varying both the complexity and the sequence of the code words an extremely secure interactive security system can be achieved.

Figure 3:
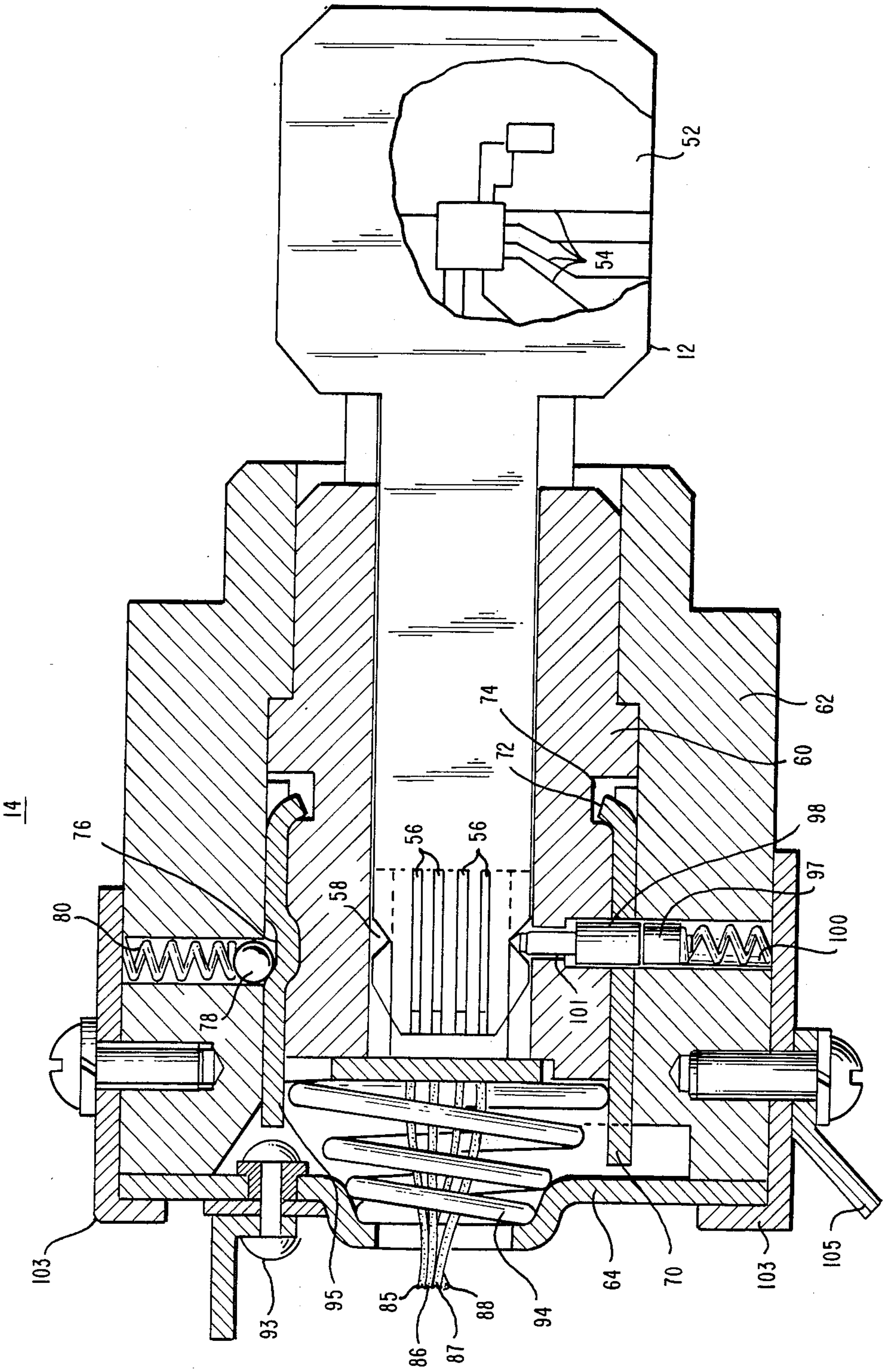
FIG. 3 is a cross-sectional view illustrating the multiposition readout unit (with the electronic key inserted) used in conjunction with the security system of FIG. 1.

The electronic key 12 is shown inserted in the readout unit 14 in FIG. 3. The electronic key 12 is a prefabricated device in which the microelectronic circuits and components are mounted on a thin, rigid or flexible printed circuit board 52 commonly used in the industry. The printed circuit board 52 initially has wing-like extensions (not shown) which carry programming conductors 54 from the microelectronic circuits to output terminals which facilitate programming of the circuitry. After the device has been programmed, the wing-like extension are cut off.

The printed circuit board 52 is mounted on a metal base (not shown) by welding, gluing or other adhesive methods. The metal base extends the entire length of the electronic key 12. After assembly of the printed circuit board and with all its necessary electronic components, some of the components may be preprogrammed and interconnected. Once the printed circuit board 52 is mounted on the metal base, the electronic key 12 will be completely encapsulated by injection molding or other commonly used techniques leaving only a limited number of contact fingers 56 at the front portion of the key 12. The electronic key 12 is also provided with a small groove 58 in the encapsulating material which extends up to the metal base leaving a small portion of the metal base exposed by the encapsulating material. This groove 58 is used to allow manipulation of the readout unit 14 after full insertion of the electronic key 12 therein. It also prevents the electronic key 12 from being removed when the electronic key 12 is in any position other than a so-called zero or home position. Except for those few mechanical functions, the electronic key has no other traditional mechanical key-type functions.

The electronic key 12 carrying the conditional state device 13 offers extremely high protection against duplication, easy mass production of the blank electronic key, permits field programming of multi-bit code words, and facilitates access to a plurality of functions by use with a multi-position read out unit 14.

The readout unit 14 will now be described in conjunction with FIGS. 3 and 4. In FIG. 3, the readout unit 14 has a rotatable inner cylinder 60, an outer housing 62, and a position contact plate 64 mounted at the rear end of the outer housing 62. The inner cylinder 60 is constructed of a plastic material by injection molding or similar techniques and has an opening therethrough its entire length shaped to allow insertion, guidance, and support of the electronic key 12. The electronic key 12 and the opening in the rotatable inner cylinder 60 are preferably rectangular in cross-section.

Figure 4:
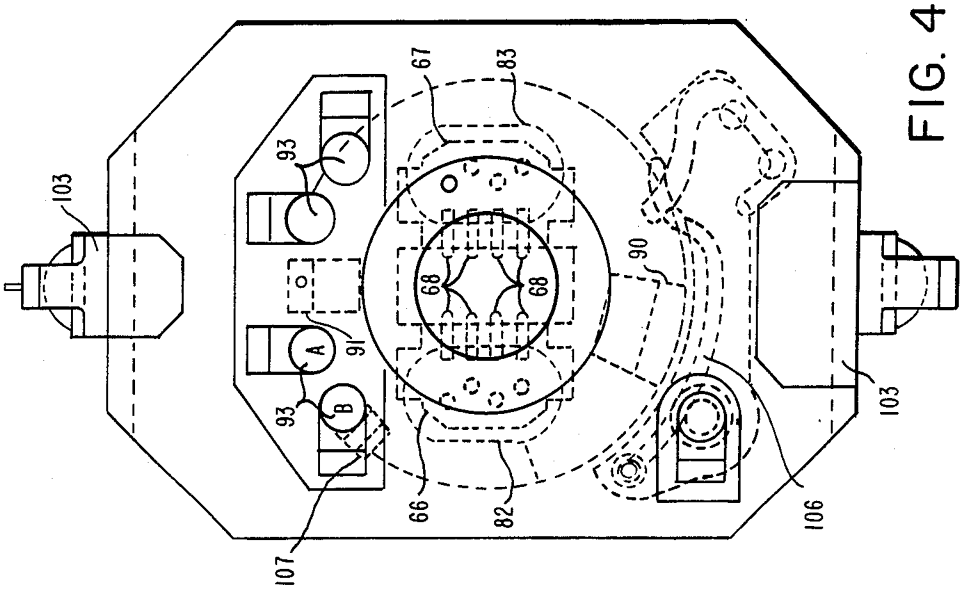
FIG. 4 is a view of the multiposition readout unit of FIG. 3 taken along the lines IV—IV.

At the rear end of the inner cylinder 60 two contact carriers 66 and 67, shown in FIG. 4, carry spring-type contacts 68 sized for mating engagement with the contact fingers 56 of the electronic key 12. The contact carriers 66 and 67 are held in place by a metal cap 70 slipped over the inner cylinder 60 from its rear end and fastened by pushing the portions of a rim 72 of the metal cap 70 into a groove 74 in the inner cylinder 60. The metal cap has a depression 76 in its circumference used in conjunction with a metal ball 78 and spring 80 located in the outer housing 62 for holding the inner cylinder 60 with light contact force in one or more positions achieved by rotating the inner cylinder 60 within the outer housing 62.

Additionally, the metal cap 70 has one or more cutouts 82, 83 in its bottom portion to allow the feed through of electrical cables 85, 86, 87, and 88 for interconnection with the contacts 68 carried by the contact carriers 66 and 67.

The position contact plate 64 contains friction buttons or rivet-type contacts 93 arranged in a circular pattern on the contact plate 64 (only one shown in FIG. 3). These contacts 93 are engaged by a pushing action of the inserted electronic key 12 which moves the inner cylinder 60 and the metal cap 70 towards the contact plate 64 allowing a portion 95 of the metal cap 70 to come into contact with the contact 93.

The position contact plate 64 is mounted at the rear end of the outer housing 62 opposite the end in which the electronic key is inserted. The contact plate 64 carries the contacts 93 and serves as an anchor for the push action spring 94 which urges the inner cylinder 62 away from the contact plate 64. The position contact plate 64 can be constructed either from nonconducting material such as a reinforced plastic material commonly used for printed circuit board applications, or conducting material such as sheet metal which would then require insulation of the contacts 93 from the position contact plate 64. If the electronic key 12 is inserted correctly in the inner cylinder 60 and rotated into the desired position, it will be maintained in that position by a light force provided by the metal ball 78 urged by the spring 80 into the depression 76 in metal cap 70. The metal ball 78 and spring 80 also provide an electrical pathway for current, preferably and probably to ground. The current thus flows through a position contact 93, the contact portion 95 of the metal cap 70, the ball 78, the spring 80, a metal clamp 35 used to hold the contact plate 64, and finally through an electrical connector 105 connected to ground. Such operation will be recognized by the control unit 16 as a particular request for the function associated with that position of the electronic key 12 and will be processed accordingly by the control unit 16.

As mentioned earlier, the electronic key 12 has a groove 58 that is used to prevent turning the inner cylinder 60 in its outer housing 62 if the electronic key 12 is not correctly inserted and also prevents removal of the electronic key 12 in any position other than a so-called zero position. An interlock function is provided by two pins 97, 98 with the first pin 98 located in a cylindrical opening 101 within the inner cylinder 60 and the second pin 97 located in a cylindrical opening 100 in the outer housing 62. When the key is initially inserted, the cylindrical openings 100 and 101 are aligned such that the pins 97 and 98 may be retracted within the cylindrical openings 100 and 101 to allow insertion of the key. Once the inner cylinder 60 has been rotated relative to the outer housing 62, the cylindrical openings 100 and 101 are no longer aligned. Any attempt to remove the electronic key 12 pushes the pin 98 against the wall of the outer housing 62 which prevents removal of the electronic key 12. Only when the key is returned to its so-called zero position wherein the cylindrical openings 100, 101 are aligned, can the electronic key 12 be removed.

Similarly, unless the electronic key 12 is properly inserted, the pin 98 will lie partially within inner cylindrical opening 101 and partially within outer cylindrical opening 100 preventing the inner cylinder 60 from rotating relative to the outer housing 62.

In one embodiment, a contact finger is used to establish contact with a sliding spring-type of contact 106, shown in FIG. 4, which may cover one or more positions. That type of contact is particularly useful in an environment wherein the security system 10 is used to operate an automobile. As shown in FIG. 4, positions A and B may be referred to as drive and start positions, respectively. In position B, the spring-type contact 106, rather than a bottom-type contact 93, may be used to request activation of the ignition because this key position is not permanent, and the spring-type contact 106 will turn the inner cylinder 60 into position A as soon as pressure on the electronic key 12 is released by the user.

Operation

The operation of the present invention may be summarized as follows. The control unit 16 shown in FIG. 1 forces the signal on the bi-directional data line 50 shown in FIG. 2 to a low state when the signal on the internal data line 48 is in a high state. That difference causes the state device 13 to be set to a known initial state which is the first state of a stepping sequence. The state device 13 then steps through a sequence of logic states in response to the input of clock pulses from the control unit 16. Each logic state of the sequence generates one bit of a state signal or code word. At the end of the stepping sequence the control unit 26 has received the entire state signal and determines if the state signal is correct. If it is, the control unit then forces the signal on the bi-directional data line 50 to a low state when the signal on the internal data line 48 is in a high state and continues inputting clock pulses. That again causes the key to begin a new stepping sequence which generates a new state signal or code word. The process is repeated until a predetermined number of proper stepping sequences is performed by the key.

The operation of the interactive security system 10 illustrated in FIG. 1 will now be described in conjunction with FIG. 5, which illustrates a flow chart of the steps performed by the state device 13, FIG. 6, which illustrates a flow chart of the steps performed by the control unit 16, and FIG. 7, which is a timing diagram illustrating the interrelationships between various signals of the state device 13 and control unit 16.

Figure 7:
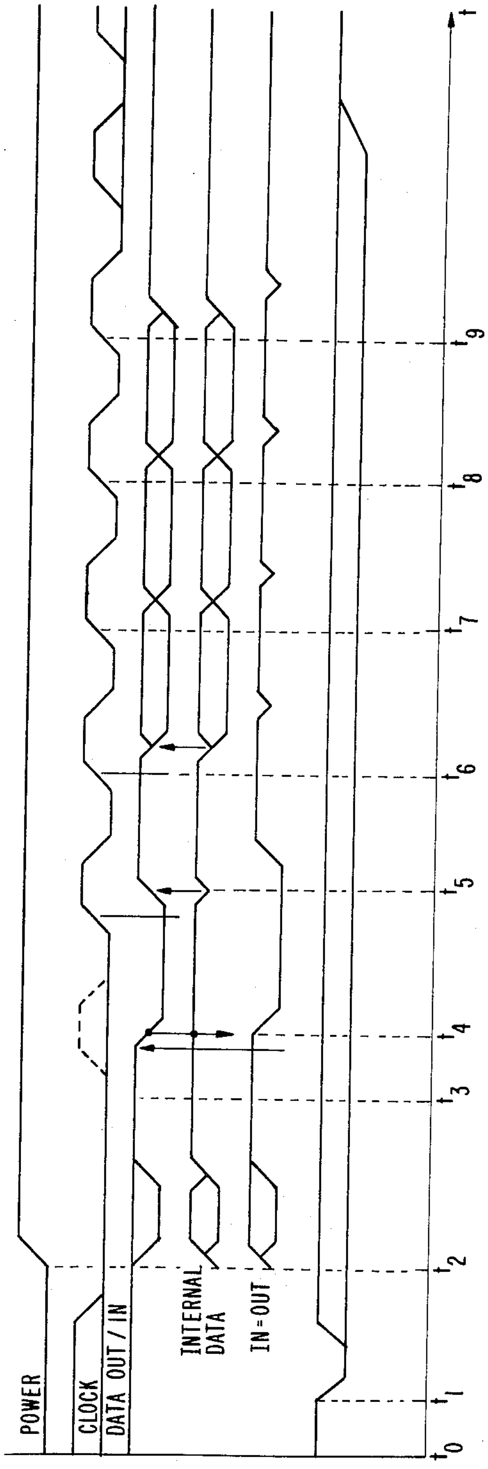
FIG. 7 is a timing diagram illustrating the inter-relationships between various signals of the electronic key and the monitoring control unit.

Inserting the key 12 to the multi-position readout unit 14, rotating the key 12 into the desired position to request a particular function, and pushing the key 12 such that the metal cap 70 contact the desired contact 93 generates an interrupt request signal at time $t_1$ in FIG. 7. This interrupt request signal is processed by the signal processing logic 32 according to known processing techniques to produce an interrupt vector. The interrupt vector contains coded information identifying which of the contacts 93 has been grounded thereby informing the microprocessor 26 which function is being requested.

Figure 6:
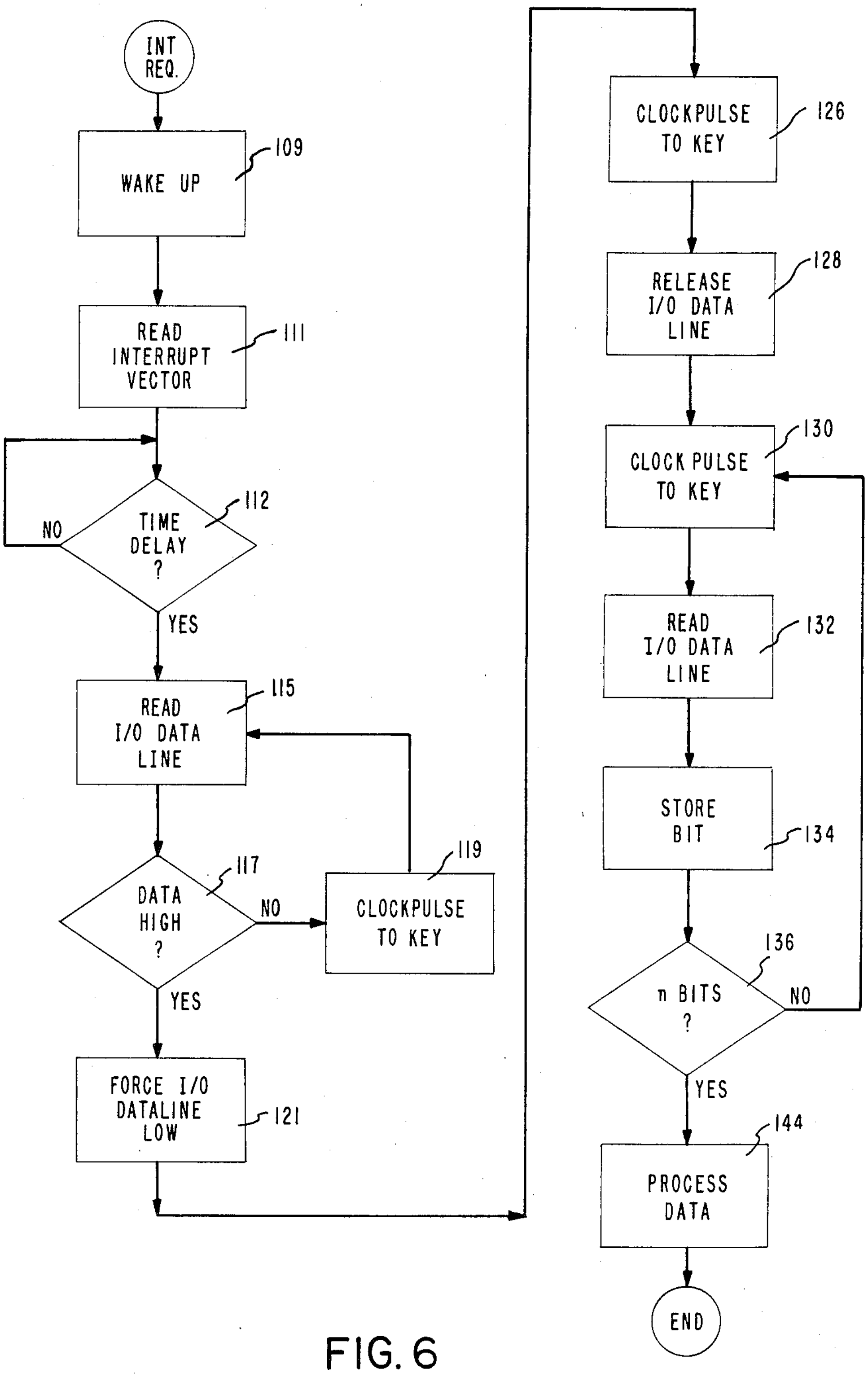
FIG. 6 is a flow chart illustrating the steps performed by the monitoring control unit.

The interrupt request signal causes the microprocessor 26 to perform an initialization sequence at step 109 in FIG. 6. During this initialization sequence, power is provided to the key 12 and a timer in the microprocessor 26 is started. After the initialization sequence 109, the microprocessor 26 reads the interrupt vector at step 111. As stated above, the interrupt vector provides the microprocessor 26 with information regarding which function is being selected. The microprocessor then determines if the timer has timed out, as indicated by the decision step 112. This time delay allows the key to reach a stable, but unknown, state after receiving power at time $t_2$ in FIG. 7. After the time delay is over, the microprocessor reads the bi-directional data line 50 at step 115 corresponding to time $t_3$ in FIG. 7.

Figure 5:
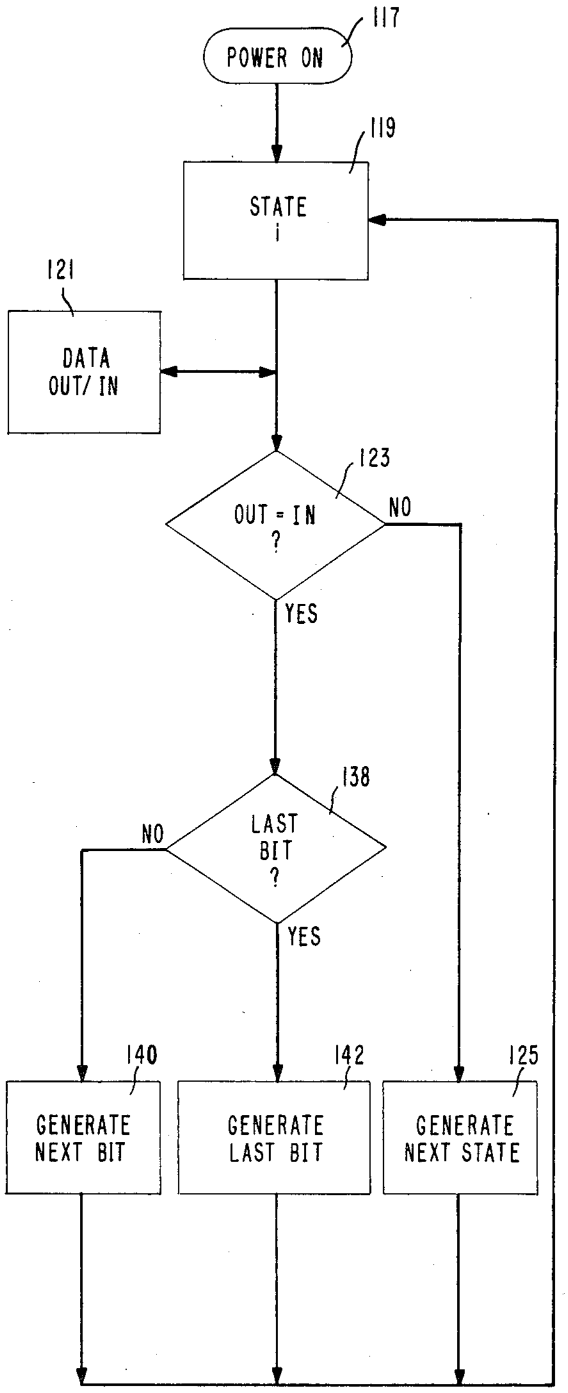
FIG. 5 is a flow chart illustrating the steps performed by the state device of the electronic key.

Turning to FIG. 5, the key receives power at step 117. During the delay period, the logic device 40 shown in FIG. 2 achieves a stable but unknown state (i) at step 119. At step 121, a high or low signal (1 or 0) depending on the state (i) is available on the data line 50 which is the line being read by the control unit.

Because it is known that electrical components when initially turned on assume random states, it is necessary for the microprocessor 26 to drive the logic device 40 to a known initial state. This is accomplished, beginning at step 115 in FIG. 6 wherein the microprocessor 26 reads the data line 50 to determine if a high or low signal is being output by the state device 13. If the signal on the data line 50 is low as determined by the negative branch of decision step 117, a clock pulse is input to the key at step 119. That clock pulse causes the state device to step to the next state and output a signal representative of that state. The data line 50 is read again at step 115. If the signal output by the state device 13 is not high as shown by a negative response at decision step 117, the microprocessor 26 loops through steps 119, 115, and 117 sequentially applying clock pulses which step the state device 13 through unknown states until the state device 13 outputs a high signal on data line 50. Once the signal on the data line 50 has assumed a high state, the microprocessor 26 forces the data line 50 into a low state at step 121. That occurs at time $t_4$ in FIG. 7.

Turning now to FIG. 5, at step 123, the state device 13 determines if the data line 50 has the same value as the internal data line 48. That was described earlier in conjunction with the logic block 38 in FIG. 2 which determines if the signals on lines 48 and 50 correspond to each other. At time $t_4$ in FIG. 7, the internal data line 48 is high, but because the data line 50 has been driven low by the microprocessor at step 121 of FIG. 6, the input and output data lines are not equal as shown by the line labeled IN=OUT? in FIG. 7. Thus, the state device recognizes that the data line 50 is being controlled from an outside source and the state device proceeds to step 125 wherein a reset state is generated. The state device then returns to step 119 but is now in a known reset state which is the first state in the stepping sequence and is ready to begin the stepping sequence.

With the state device in a known logic state, the microprocessor 26 must control the state device 13 to output from the key a state signal or code word representative of the first stepping sequence. To output the first state signal or code word from the key 12, the microprocessor 26 in FIG. 6 releases the data line 50 at step 128 and inputs a clock pulse to the key via line 41 in FIG. 2 at step 130. The clock pulse input to the key at step 130, $t_6$ in FIG. 7, causes the key to step to the next state and output a signal generated by that state of logic device 40 as discussed hereinabove in conjunction with FIG. 2. Each state in the stepping sequence generates a one bit signal. The microprocessor reads the one bit signal from the data line 50 at step 132. The bit read from the data line 50 at step 132 is stored at step 134 and the microprocessor 26 determines a step 136 from information in its memory whether a sufficient number of bits has been read such that the microprocessor 26 has received the entire code word. If not, the microprocessor loops through steps 130, 132, 134, and 136 until the entire code word has been read from the key 12.

Returning to FIG. 5, each time the key receives a clock pulse the key steps to the next state in the stepping sequence and outputs another bit of the code word. That is accomplished by steps 119, 121, 123, 138, 140, and 142. At step 121 one bit of the code word representative of the present state is output in response to the input of a clock pulse from the microprocessor 26. At step 123, because the microprocessor 26 has released the data line 50, the data line 50 is being driven by the state device such that the signals on the internal data line 48 and the data line 50 correspond to each other. Thus, the state device proceeds to step 138 to determine if a sufficient number of states has been generated, i.e. is the stepping sequence complete. If the last step is not about to be performed, the next state is generated at step 140 and the program returns to step 119 after receiving another clock pulse. The same routine is performed until at decision step 138, the key determines that the last state is about to be performed. When that occurs, the last state is generated at step 142. Upon input of another clock pulse, a signal representative of that last state will be output at step 121. Because one bit of the code word is output in response to each clock pulse, at times, $t_6$, $t_7$, $t_8$, and $t_9$ in FIG. 8, one bit of the code word is output from the key 12 and input into the microprocessor 26.

In this manner, the key steps through a stepping sequence of logic states generating one bit in each logic state. The entire stepping sequence generates a state signal or code word having a number of bits equal to the number of logic states in the stepping sequence. A code word of any length can be provided by providing an equal number of logic states in the stepping sequence. Clearly, the more complex the code word, the more secure the system.

After the entire code word or state signal representative of the initial stepping sequence has been received by the microprocessor 26, the microprocessor processes that data at step 144. That processing may, for example, include comparing the received state signal to a stored plurality of predetermined state signals. If there is a match with one of the stored state signals the microprocessor 26 may, according to its preprogrammed instructions, grant access or it may require the generation of another code word representative of another stepping sequence.

Having driven the key through an initial stepping sequence, the microprocessor 26 can return to step 115 to again cause the signals on the data line 50 and the internal data line 48 of the key to be unequal which, because of decision step 123 in FIG. 5, causes the key to generate a next initial state as indicated by block 125. The key would then be stepped through a second stepping sequence and a state signal or code word representative of that second stepping sequence would be read from the key in the same manner as just described. Thus, it is possible to drive the key 12 through any desired number of stepping sequence, with each stepping sequence represented by a state signal or code word. Clearly, the more stepping sequences or code words which must be generated before access is granted, the more secure the system.

Again, at step 144, the microprocessor would process the data representative of the newly received code word according to its preprogrammed instructions to determine if the code word is proper. If so, the microprocessor 26 can grant access or request yet another code word by merely returning to step 115.

Those of ordinary skill in the art will recognize the high degree of security which the present interactive security system 10 provides. By requiring the key to cycle through a number of stepping sequences and by having each stepping sequence represented by a state signal or code word, an extremely secure system is provided. Should the key fail to generate the correct code words in the proper order, access would be denied. By controlling the length of each code word and the number of code words, any degree of security can be achieved.

The above-described embodiment is but one example of how the state device can be initialized and stepped through a stepping sequence. Many other methods exist for initializing the state device, controlling how it steps through a stepping sequence, and determining how each logic state is related to the previous logic states of the stepping sequence. The interactive security system of the present invention is also extremely flexible and may be used with any number of various input or output devices. While the present invention has been described in connection with an exemplary embodiment thereof, it will be understood that many modifications and variations will be readily apparent to those of ordinary skill in the art. This application and the following claims are intended to cover those modifications and variations.

What I claim is:

1. An interactive security system for controlling access, comprising:

conditional state means for cycling through a sequence of logic states with a first logic state varying as a function of the present state of said conditional state means, said conditional state means having an input for receiving control signals, at least one output and monitoring means for evaluating the condition of said at least one output and a conductor connected thereto;

means for applying control signals to said input and for receiving signal information from said at least one output; said means for applying responsive to signal information of one condition from said output to apply a first logic level to said conductor connected to said at least one output and apply additional control signals to said input and responsive to signal information of another condition to apply additional control signals to said input, said monitor means acting in the presence of said first logic level to place said conditional state means in an initial condition to cause a sequence of logic states to be read in response to said control signals;

means for storing a predetermined state signal;

means for comparing;

means for establishing bi-directional communication between said conditional state means and said means for comparing, said conditional state means being removable from said bi-directional communication means, said means for comparing receiving a state signal produced from said removable conditional state means, comparing said produced state signal to said stored predetermined state signal, and enabling access in response to the production of a proper sequence of logic states as indicated by said comparison of said produced state signal to said stored state signal.

2. An interactive security system according to claim 1 wherein said conditional state means includes a device constructed of integrated fuse logic.

3. An interactive security system according to claim 2 wherein said conditional state device includes a device constructed of programmable array logic.

4. An interactive security system according to claim 1 wherein said means for applying control signals includes first means for producing a plurality of control signals and said removable conditional state means includes means for producing a plurality of state signals.

5. An interactive security system according to claim 4 wherein each of said control signals is unique.

6. An interactive security system according to claim 5 wherein said means for storing includes means for storing a plurality of predetermined state signals and wherein each of said plurality of stored predetermined state signals corresponds to one of said control signals.

7. An interactive security system according to claim 6 wherein said means for comparing includes means for comparing each of said produced state signals to said stored predetermined state signal corresponding to the control signal responsible for the production of said produced state signal.

8. An interactive security system according to claim 1 wherein said produced state signal and said predetermined stored state signal are n-bit digital signals representative of a sequence of n-logic states.

9. An interactive security system according to claim 1 wherein said control signal is an n-bit digital signal.

10. An interactive security system according to claim 1 wherein said removable conditional state means includes a conditional state device for cycling through said sequence of logic states with the first logic state varying as a function of said control signal and each subsequent logic state in said sequence being a function of at least the previous logic state.

11. An interactive security system according to claim 10 wherein said conditional state device includes a register holding a signal representative of the present state, a first logic device responsive to said register for generating a control term, and a second logic device responsive to said register and said first logic device to combine said present state signal and said control term to generate the next state, a signal representative of the next state being stored in said register.

12. An interactive security system according to claim 11 additionally comprising a source of clock pulses, and wherein said next state is produced from said present state in response to a clock pulse.

13. An interactive security system according to claim 1 wherein said conditional state means includes a device constructed of a programmable logic sequencer.

14. An interactive security system according to claim 1 additionally comprising an electronic key for carrying said conditional state means.

15. An interactive security system according to claim 1 wherein said means for establishing bi-directional communication includes means for receiving said removable conditional state means.

16. An interactive security system according to claim 15 wherein said means for receiving produces an interrupt signal for initializing said means for applying control signals when said removable conditional state means is inserted therein.

17. An interactive security system according to claim 16 wherein after said means for applying control signals is initialized, said means for applying produces said control signals.

18. An interactive security system according to claim 15 wherein said means for receiving is manipulable into a plurality of positions by manipulation of said removable conditional state means, each of said positions being representative of a function to which access is controlled.

19. An interactive security system according to claim 18 wherein said means for receiving is cylindrical, and is manipulable by rotation of said removable conditional state means.

20. An interactive security system according to claim 15 wherein said means for receiving includes means for receiving said removable conditional state means in a plurality of insertion orientations, each insertion orientation being representative of a function to which access is controlled.

21. An interactive security system according to claim 18 wherein said removable conditional state means includes conditional state means for producing a separate state signal for each function to which access is controlled.

22. An interactive security system according to claim 21 wherein portions of said state signals are the same for each function to which access is controlled.

23. An interactive security system for selectively controlling access comprising:

conditional state means for cycling through a sequence of logic states with a first logic state varying as a function of the present state of said conditional state means, said conditional state means having an input for receiving control signals, at least one output and monitoring means for evaluating the condition of said at least one output and a conductor connected thereto;

means for applying control signals to said input and for receiving signal information from said at least one output; said means for applying responsive to signal information of one condition from said output to apply a first logic level to said conductor connected to said at least one output and apply additional control signals to said input and responsive to signal information of another condition to apply additional control signals to said input, said monitor means acting in the presence of said first logic level to place said conditional state means in an initial condition to cause a sequence of logic states to be read in response to said control signals;

means for storing a predetermined state signal;

means for comparing;

means for establishing bi-directional communication between said conditional state means and said means for comparing, said conditional state means being removable from said bi-directional communication means;

means for selecting an access feature, said means for comparing receiving a state signal produced from said removable conditional state means, comparing said produced state signal to said stored predetermined state signal, and enabling access in response to said means for selecting and the production of a proper sequence of logic states as indicated by said comparison of said produced state signal to said stored state signal.

24. An interactive security system according to claim 23 wherein said removable conditional state means includes a conditional state device for cycling through said sequence of logic states with the first logic state varying as a function of said control signal and each subsequent logic state in said sequence being a function of at least the previous logic state.

25. An interactive security system according to claim 24 wherein said conditional state device includes a register holding a signal representative of the present state, a first logic device responsive to said register for generating a control term, and a second logic device responsive to said register and said first logic device to combine said state signal and said control term to generate the next state, a signal representative of the next state being stored in said register.

26. An interactive security system according to claim 25 additionally comprising a source of clock pulses, and wherein said next state is produced from said present state in response to a clock pulse.

27. An interactive security system according to claim 23 wherein said conditional state means includes a device constructed of a programmable logic sequencer.

28. An interactive security system according to claim 23 wherein said means for establishing bi-directional communication and said means for selecting includes means for receiving said removable conditional state means, said means for receiving being manipulable into a plurality of positions by manipulation of said removable conditional state means, each of said positions enabling selection of an automotive feature.

29. An interactive security system according to claim 28 wherein said means for receiving includes cylindrical means manipulable by rotation of said removable conditional state means.

30. An interactive security system according to claim 23 wherein said means for establishing bi-directional communication and said means for selecting includes means for receiving said removable conditional state means in a plurality of insertion orientations, each insertion orientation enabling selection of an automotive feature.

* * * * *